United States Patent Office 3,535,308
Patented Oct. 20, 1970

3,535,308
PROCESS FOR THE PREPARATION OF PARTIALLY ESTERIFIED POLYHYDROXYLIC POLYMERS
Frederic Charles Schaefer, Darien, Conn., and William Douglas Zimmermann, Bronx, N.Y., assignors to American Cyanamid Company, Stamford, Conn., a corporation of Maine
No Drawing. Filed Jan. 15, 1968, Ser. No. 697,591
Int. Cl. C08b 3/22, 25/00, 29/00
U.S. Cl. 260—209.5
9 Claims

ABSTRACT OF THE DISCLOSURE

Polymers containing up to about one organic ester group for about every 10 esterifiable hydroxyl groups are prepared by contacting a polymer having esterifiable hydroxyl groups with a cyanamide compound and a carboxylic acid having a $K_a$ of about $10^{-3}$ or higher for a period of time sufficient to impregnate the polymer therewith, and then heating the impregnated polymer to produce partially esterified polymers which are essentially free from nitrogen.

BACKGROUND OF THE INVENTION

Field of the invention

Polyhydroxylic polymers, partially esterified with carboxylic acids.

Description of the prior art

Organic esters of polyhydroxylic polymers such as cellulose and its derivatives are generally prepared by reacting the polymers, with the appropriate acid, acid anhydride, or acid chloride. Direct treatment with an acid yields minimal esterification. The acid chlorides in pyridine solvents give better results but frequently introduce appreciable amounts of undesirable matter such as nitrogen and chlorine into the polymer. The acid anhydrides also give good results and are widely used for the purpose. The main disadvantage of the anhydrides is their instability in water thus necessitating anhydrous reaction conditions.

Morton et al. in U.S. Pat. 2,530,261 teach the esterification of cellulose polymers in an aqueous environment using strong mineral acids and cyanamide. However, the esterified cellulose also contains appreciamble quantities, as high as 8%, of combined nitrogen.

Organic esters of cellulosic polyhydroxylic polymers and the like have many well-known uses. For example, they impart water-insoluble surface coatings or sizings to the polymer; they are used as enteric coatings for medical purposes; the esterified polymers exhibit a variety of enhanced textile properties over their non-esterified counterpart. These and other uses are presented by Ott et al. in Cellulose and Cellulose Derivatives, vol. V, part II, pp. 763–820.

SUMMARY OF THE INVENTION

This invention relates to a process for preparing organic esters of polyhydroxylic polymers. More particularly it relates to a process for preparing partially esterified polyhydroxylic polymers containing substantial degrees of esterification. By "substantial" is meant that a sufficient proportion of esterifiable hydroxyl groups is esterified to impart desirable new properties to the polymer substrate while not simultaneously altering the original desirable properties of the polymer. The organic ester grouping may be derived from a variety of carboxylic acids provided the acid has a $K_a$ (i.e. ionization constant) of about $10^{-3}$ or higher.

According to the inventive process, polymers containing a substantial degree of esterification, but yet essentially free from combined nitrogen, are prepared by contacting a polyhydroxylic polymer containing esterifiable hydroxyl groups with a cyanamide compound and a carboxylic acid for a time sufficient to impregnate the polymer with the cyanamide and acid. The impregnated polymer is then heated for a time sufficient to react the polymer, cyanamide compound, and carboxylic acid to produce the partially esterified polymer described hereinabove. The contact between polymer, cyanamide, and acid may occur in an aqueous or other suitable environment. The impregnated polymer may be removed from contact with the cyanamide and acid before performing the heating step, but this is not essential.

Polymers containing up to about one ester grouping for about every ten esterifiable hydroxyl groups may be prepared by the inventive process.

The partially esterified polymers so produced are, surprisingly, essentially free from combined nitrogen, the substantial presence of which could interfere with, among other things, the anonic character of the polymers. The polymers are considered essentially free from combined nitrogen when their nitrogen content is less than about 0.5%.

It is an object of this invention to provide a novel process for preparing esterified polyhydroxylic polymers possessing a substantial degree of organic esterification.

It is another object of this invention to produce such polymers essentially free from combined nitrogen.

It is a further object of this invention to produce the nitrogen free esterified polymer in an aqueous environment.

It is a still further object of this invention to provide an esterification process conveniently adaptable to continuous processing of the polymer.

These and other objects of the invention will be apparent from a reading of the total specification.

DESCRIPTION OF THE PREFERRED EMBODIMENT

The partial esterification of polyhydroxylic polymers, according to the present invention, is believed to proceed in a two-step reaction sequence as shown in the following chemical equations:

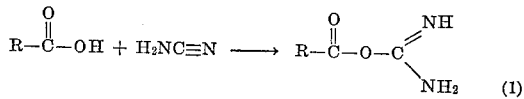

(1)

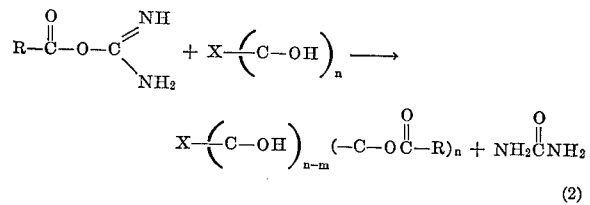

(2)

In the above equations, R is any grouping which assures that the carboxylic acid, $RCO_2H$, has a $K_a$ in excess of about $10^{-3}$ or higher and X represent a polymeric backbone structure.

A wide variety of polyhydroxylic polymers can be employed in the practice of this invention. Among them are cellulose and cellulose derivatives as well as starch and starch derivatives such as hydroxymethyl and hydroxyethyl starch; amylose and amylopectin starches; dextrins; pectins; polysaccharide gums, i.e., the mucilages, such as agar, algin, tragacanth, arabic, locust bean, guar, cedar, Indian, satinwood, cherry, sassa, karaya, caragenin, angico, mesquite, sterculia, and the like; water-dispersible cellulose derivatives such as methyl cellulose, sodium carboxymethylcellulose, and the like; hemicelluloses, such as xylan, araban, mannan, galactan, and the like. The invention also includes treatment of mixtures of two or more of the foregoing materials.

The foregoing materials can be substantially of any type or source. Thus, starch may be corn starch, potato starch, wheat starch, tapioca and the like, including moderately hydrolyzed forms having reduced viscosity. Gelatinized starches, i.e., starches swelled to a viscous solution or paste, may be employed although such pretreatment is unnecessary. When gelatinized starches are utilized, however, little or no additional water will be added to the reaction mixture, directly or via a concentrated acid, since the substrate will contain sufficient water for effective reaction and esterification.

The invention also includes treatment of other natural polymeric materials such as wood.

Among the suitable acids are included such diverse members as maleic, fumaric, cyanoacetic, chloroacetic, dichloroacetic, methoxyacetic, $\alpha,\alpha$-difluoropropionic, and the like, including mixtures of said acids. The dibasic acids are preferred since ordinarily only one of the carboxyl groups will react as above. The result is half-ester formation which leaves a free carboxyl group. This group imparts anionic character to the polymer, the degree of anionic character depending upon the degree of half-ester substitution in the polymer. Cellulosic polymers such as rayon and cellophane have shown strong affinity for cationic dyes such as methylene blue after partial esterification by the present invention whereas before esterification there was essentially no affinity whatsoever for the same dyes.

Among the dibasic acids, the readily available and inexpensive maleic and fumaric acids are highly preferred. Ester groups derived from these acids have shown particularly effective resistance to the removal of the ester groups by hydrolysis. This is probably due to the protection given by the free carboxyl group against hydrolytic cleavage. Furthermore, the double bond present in these acids is highly reactive and is a suitable site for grafting monomers such as acrylonitrile, styrene, and methylmethacrylate, to the polymer to alter the texture and other properties of the polymer. The double bond is also reactive toward nucleophilic reagents such as bisulfite ions thereby permitting addition of sulfonic acid groups or the like which can further enhance the anionic character of the polymer. Such groups will also enhance the water solubility of the polymer.

It is highly desirable in preparing the maleic and fumaric acid substituted polymers to use polyhydroxylic polymers having less than about 10% of the hydroxyl units previously substituted with constituents other than maleic or fumaric acid half esters. Polymers having this reduced degree of prior hydroxyl unit substitution are particularly susceptible to the substitution of substantial amounts of maleic and fumaric acid half ester groupings in accord with the process of this invention.

Cyanamide, $H_2NCN$, is the preferred cyanamide compound, but alkali metal or alkaline earth metal salts of cyanamide may also be employed alone or in admixture of two or more. Among such salts may be mentioned the sodium, potassium or calcium salts such as CaNCN, Ca(HNCN)$_2$, NaHNCN, or Na$_2$NCN. When a salt such as CaNCN is employed in place of cyanamide, more than two moles of a mono basic reactive acid such as cyanoacetic will be required to provide acid for reaction with the cyanamide since two moles of the acid will be used up in the neutralization of the cyanamide salt to produce cyanamide. In similiar fashion more than one mole of acid will be required when NaHNCN is employed.

The polymer may be impregnated with a solution of the cyanamide compound in the acid, or with an aqueous or organic solvent solution of the acid and cyanamide compound. Useful inert organic solvents include ether, ethyl acetate, dioxane, and equivalents thereof. When an aqueous solution is used, it is desirable to use an excess of the cyanamide compound to compensate for hydrolysis of cyanamide to urea. Alternatively, aqueous solutions should be as concentrated as possible to minimize hydrolysis.

The strength of the cyanamide and acid in solution may be varied depending upon the degree of esterification required. The stronger the solution, the more reactants which are impregnated within the polymer and the higher the degree of ester substitution which will be achieved if constant conversion rates are maintainable. Solutions containing about 50% of combined acid and cyanamide, with the cyanamide present in 100% excess of the acid, have been found generally suitable. Very dilute solutions are to be avoided unless only a minimal degree of esterification is desired.

In carrying out the process of the invention, the polymer is immersed in the mixture of the acid and cyanamide for a time sufficient to impregnate the polymer with enough acid and cyanamide to achieve the desired degree of esterification. Ordinarily room temperature is preferred for the impregnation step. Elevated temperatures are to be avoided in order to prevent increased cyanamide hydrolysis.

After the polymer is impregnated, the temperature is raised to carry out the esterification reaction. This heating step may be carried out either with the polymer remaining immersed in the acid-cyanamide solution or after its removal therefrom. In the former case, the temperature of the solution is raised to 60–100° C. until partial esterification is completed. In the latter case, which is the preferred method, the impregnated polymer is removed from the bath and pre-dried at 25–60° C. to remove solvent and then heated at 60–100° C. with a preferred temperature of about 80° C., until partial esterification is complete. Volatile inert impregnation bath solvents (i.e. those having a boiling point less than about 100° C.) are preferred to facilitate their removal prior to performing the heating step.

The esterified product from either route is water washed to remove starting reagents and by-products.

The preferred method is particularly adaptable to the continuous processing of textile strands. It has the further advantage of not subjecting the bulk of the impregnating solution to extremes of temperature which can degrade the entire solution to the point of uselessness. By impregnating at room temperature and continually removing the polymer from the bath before heating, the bath can be maintained relatively chemically stable and can be continually replenished with fresh solution to compensate for impregnation losses.

The degree of esterification achieved will depend on many factors such as the nature of the polymer and the acid, the degree of impregnation achieved, the concentration of acid and cyanamide in the impregnating solution, and the like. Polymers containing as many as one ester grouping for about every ten to about every thirty esterifiable hydroxyl groups have been prepared.

EXAMPLE 1

Partial esterification of cellophane with maleic acid

An aqueous 2.0 M maleic acid ($K_a=1.4\times14^{-2}$) and 4.0 M cyanamide solution was prepared by dissolving 232 g. of maleic acid and 168 g. of cyanamide in a liter of water. The solution was allowed to stand at room temperature for ten minutes. A piece of dry cellophane film (1.5–2.0 g.) was immersed in the solution for 30 minutes to obtain a 112% weight increase after the film was removed from solution and its surface dried by blotting. The impregnated film was dried at 58–60° C. for 45 minutes in a forced draft oven. It was then heated at 80° C. The film was thoroughly washed with water to remove by-products and unreacted acid and then redried. Using infra-red spectroscopic techniques or saponification analysis the extent of conversion to ester could be determined.

Saponification analysis showed the cellophane to contain one maleic acid half-ester grouping for each 17–18 hydroxyl units on the cellophane, representing a 46% conversion of the impregnated acid to half ester. The product was highly anionic showing a strong affinity for cationic dyes.

EXAMPLE 2

Partial esterification of cellophane with cyanoacetic acid

Following the procedure of Example 1, except replacing maleic acid with cyanoacetic acid ($K_a = 3.7 \times 10^{-3}$), the impregnated cellophane showed a weight increase of 110% and gave a partially esterified product containing one ester group for each 16.7 hydroxyl units, corresponding to a 48% conversion of the impregnated acid.

EXAMPLE 3

Partial esterification of cellophane with dichloroacetic acid

Following the procedure of Example 1, except replacing maleic acid with dichloroacetic acid ($K_a = 3.3 \times 10^{-2}$) and heating at a temperature of about 80 to 100° C., the impregnated cellophane showed a weight increase of 121% and gave a partially esterified product containing one ester group for each 20 hydroxyl units, corresponding to a 37% conversion of the impregnated acid.

EXAMPLE 4

Partial esterification of rayon using cyanamide and various acids in aqueous and organic solvent solutions The general procedure of Example 1 was followed except water was in some instances replaced by an organic solvent. In all cases the acid concentration in solution was 0.05 mole per 25 g. of solution with the mole ratio of cyanamide to acid held constant at 2.0. Results are tabulated above.

We claim:

1. A process for preparing partially esterified polyhydroxylic polymers selected from the group consisting of starch and derivatives thereof, cellulose and derivatives thereof, dextrins, pectins, polysaccharide gums, hemicelluloses, and wood, which are essentially free from combined nitrogen and contain up to about one organic acid ester group for about every 10 esterifiable hydroxy groups, which comprises:

(a) bringing into contact said polyhydroxylic polymer, a cyanamide compound selected from the group consisting of cyanamide, an alkali metal salt of cyanamide, and an alkaline earth metal salt of cyanamide, and a carboxylic acid having a $K_a$ greater than $10^{-3}$ for a time sufficient to impregnate the polymer with the cyanamide compound and acid, and then (b) reacting said polymer, cyanamide compound, and carboxylic acid by heating the impregnated polymer whereby said partial esterification is achieved.

2. The process of claim 1 wherein the polyhydroxylic polymer is selected from the group consisting of cellulose and cellulose derivatives.

3. The process of claim 2 wherein the acid is a dibasic carboxylic acid.

4. The process of claim 3 wherein the polymer is impregnated with a solution of the cyanamide compound and the carboxylic acid, the solvent for the solution being selected from the group consisting of water and inert volatile liquids.

5. The process of claim 4 wherein the cyanamide compound is present in molar excess to the carboxylic acid.

6. The process of claim 5 where the cyanamide compound is cyanamide.

7. The process of claim 6 wherein the carboxylic acid is selected from the group consisting of maleic and fumaric.

8. The process of claim 7 wherein the polymer, prior to the heating step, is removed from the impregnating solution after impregnation is complete.

9. The process of claim 1 wherein the polymer, prior to the heating step, is removed from the impregnating solution after impregnation is completed.

| Example No. | Acid | Solvent | Percent wet pick-up | Heating conditions | Hydroxyl units per ester unit | Percent conversion of impregnated acid |
|---|---|---|---|---|---|---|
| 4 | Cyanoacetic | Water | 185 | 30 minutes at 80° C. | 11.1 | 43 |
| 5 | do | Ethyl ether | 280 | do | 12 | 27 |
| 6 | do | Ethyl acetate | 325 | do | 12 | 25 |
| 7 | Chloroacetic | Ethyl ether | 300 | 45 minutes at 60° C. | 23 | 13 |

References Cited

UNITED STATES PATENTS

| | | | |
|---|---|---|---|
| 2,233,475 | 3/1941 | Dreyfus | 260—224 |
| 2,505,561 | 4/1950 | McIntire | 260—224 |
| 2,530,261 | 11/1950 | Morton et al. | 8—116.2 |
| 3,051,698 | 8/1962 | Elizer et al. | 260—224 |
| 3,051,691 | 8/1962 | Elizer et al. | 260—91.3 |

DONALD E. CZAJA, Primary Examiner

R. W. GRIFFIN, Assistant Examiner

U.S. Cl. X.R.

8—116.2, 120; 117—165; 260—209, 209.6, 224, 231, 233.3, 233.5